United States Patent
Jain et al.

(10) Patent No.: US 12,333,302 B2
(45) Date of Patent: Jun. 17, 2025

(54) SYSTEM AND METHOD FOR ARTIFACT ORDER AND RANK SYNCHRONIZATION

(71) Applicant: OPSHUB INC., Palo Alto, CA (US)

(72) Inventors: Sandeep Jain, Palo Alto, CA (US); Gaurav Chavda, Ahmedabad (IN)

(73) Assignee: OPSHUB, Palo Alto, CA (US)

( * ) Notice: Subject to any disclaimer, the term of this patent is extended or adjusted under 35 U.S.C. 154(b) by 248 days.

(21) Appl. No.: 17/939,299

(22) Filed: Sep. 7, 2022

(65) Prior Publication Data

US 2024/0078108 A1 Mar. 7, 2024

(51) Int. Cl.
*G06F 9/44* (2018.01)
*G06F 8/77* (2018.01)
*G06F 16/23* (2019.01)
*G06F 16/27* (2019.01)

(52) U.S. Cl.
CPC ............ *G06F 8/77* (2013.01); *G06F 16/2365* (2019.01); *G06F 16/27* (2019.01)

(58) Field of Classification Search
CPC .......... G06F 8/77; G06F 16/27; G06F 16/2365
See application file for complete search history.

(56) References Cited

U.S. PATENT DOCUMENTS

2012/0317075 A1* 12/2012 Pasumarthi ............ G06F 16/27
707/626
2016/0189078 A1* 6/2016 Gajdzinski ....... G06Q 10/06375
705/7.37

* cited by examiner

*Primary Examiner* — Chuck O Kendall
(74) *Attorney, Agent, or Firm* — Joy S Goudie

(57) ABSTRACT

A processor-implemented method and a system for artifact order and rank synchronization is provided. The method includes determining, using a ranking module, if a rank of an artifact has changed across disparate tools in an organization eco-system of a source comprising an end system from where integration reads the data for synchronization, by determining if hierarchy processing is required or not. The method also includes updating, using a rank update module, the rank of the artifact in a target comprising an end system where integration writes data.

12 Claims, 10 Drawing Sheets

| | | | | |
|---|---|---|---|---|
| id | integer ($int64) | | | |
| name | string | | | |
| parentId | integer ($int64) | | | |
| position | integer ($int64) | | | |
| attachments | < [.....] | | | |
| folders | < [.....] | | | |
| description | string | | | |
| parent | < [.....] | | | |
| watchers | < [.....] | | | |
| issues | v [Issue Data v { | | | |
| | id | integer ($int64) | | |
| | position | integer ($int64) | | |
| | positionTime | integer ($int64) | | |
| | data | IssueRefJsonBean | {.....} | |
| | issues | v [ v { | | |
| | }] | | | |
| }] | | | | |

FIG.4

| Order | Work Item Type | Title | State | Value Area | Assigned To | Sum of Task Completed Work | Completed Work | Stack Rank |
|---|---|---|---|---|---|---|---|---|
| 1 | Project | > AGCO | Requirements | | Gaurangi Chandra | 13.5 | | |
| 2 | Project | V 3M | Requirements | | Akash Bhavsar | 29.5 | | |
| | Requirement | meetings | New | Business | | 28.5 | | |
| | Task | 02/05/2022 Mapping Discussion | ● Closed | | Gaurav Chavda | 0 | 1 | 666666666 |
| | Task | April Meeting | ○ New | | | 0 | 21 | 1333333332 |
| | Task | 06/05/2022 Mapping Discussion | ● Closed | | Gaurav Chavda | 0 | 1 | 1416666666 |
| | Task | 02/05/2022 Mapping Discussion | ○ New | | Akash Bhavsar | 0 | 1 | 1499999999 |
| | Task | 06/05/2022 Mapping Discussion and OIM License Installation | ○ New | | Akash Bhavsar | 0 | 1 | 1833333333 |
| | Requirement | > Offline Tasks | ○ New | Business | Akash Bhavsar | 1 | | |

FIG.5

SYSTEM AND METHOD FOR ARTIFACT ORDER AND RANK SYNCHRONIZATION

BACKGROUND

Technical Field

The embodiments herein, in general, relate to a field of updating software applications and agile methodology. The embodiments herein are more particularly related to executing backlogs at different levels based on artifact order or rank. The embodiments herein are more particularly related to a system and a method for artifact order and rank synchronization.

Description of the Related Art

Typically, industry has adopted Agile methodology and does multiple smaller sprints in a year. In addition to meeting customer demands, there is constant need to support new features to stay ahead of competition. This requires backlogs to be ordered as per business needs such that across the organization, teams are aligned to execute backlogs at different levels, as per given artifact order or rank by product team. Executing backlogs by rank allows product team to first complete business critical backlogs. Engineering team further ranks each user story to ensure that must have user stories are getting completed as soon as possible and similarly quality assessment team can plan to test higher ranked artifacts and user stories.

Moreover, Artifact rank wise execution, across different teams, gets challenging as different teams typically uses different tools to plan and execute their tasks. Additional fact that artifact rank is not constant i.e. it can change with time and as certain business variables get clear. In today's world, with disparate teams working on disparate tools, it becomes very difficult to keep all teams up to date with artifact rank.

Existing solution typically relies on one-time export-import of artifacts with rank or excel document exchange. Both these approaches do not support updating artifacts when rank changes and are manual. There is a need to automatically synchronize artifact rank and keep it up to date across organization eco-system. But with disparate tools from different vendors, most of tools follow different ranking logic, making it is difficult to do straight forward synchronization. Some systems use simple numeric value to determine artifact rank, some systems use text based computed artifact rank, some systems just maintain artifact that is ranked before a given artifact and artifact that is ranked after a given artifact, and some systems have flat hierarchy in ranking whereas other systems can define parent-child in ranking. Rank synchronization problem gets further challenging when artifact's siblings are not synchronized yet. Therefore, there is a need of global model which can bridge structural gaps between different systems and can synchronize artifact rank across systems.

Hence there is a need for a system and method, for artifact order or rank synchronization across different tools. Further there is a need for a system and method to automatically synchronize artifact rank and keep it up to date across organization eco-system. Still further there is a need for a global model for bridging structural gaps between different systems and synchronizing artifact rank across systems.

Objects of the Embodiments Herein

The primary object of the embodiments herein is to provide a method and system for artifact order and rank synchronization.

Another object of the embodiments herein is to provide flat ordering artifact type. This is a most simplified structure which has a flat structure within the same type of records.

Yet another object of the embodiments herein is to provide a system and method to enable users to order artifacts in priority order in a flat structure.

Yet another object of the embodiment herein is to provide a system and method to enable hierarchical ordering. The structure contains parent child nodes, and level wise ordering within single artifact type.

Yet another object of the embodiment herein to provide an artifact rank order synchronization system and method that is used in any type of ALM, database, design, files, QA etc. that has concept of data ordering.

Yet another object of the embodiment herein is to provide a system and method for using Artifact order, rank, and hierarchy synonymously.

Yet another object of the embodiment herein is to provide a system and method to be extended to read or write to source and target system directly using database, files, library. APIs, web services, disk or any other way possible.

Yet another object of the embodiment herein is to provide a system and method for representing hierarchy using different types of models Yet another object of the embodiment herein is to provide a system and method for hierarchical ordering with single artifact type.

Yet another object of the embodiment herein is to provide a system and method for hierarchical ordering with multiple artifact type.

These and other objects and advantages will become more apparent when reference is made to the following description and accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

This summary is provided to introduce a selection of concepts in a simplified form that are further disclosed in the detailed description. This summary is not intended to determine the scope of the claimed subject matter.

The embodiments herein address the above-recited needs for a system and a method for automated mechanism using real data to filter, prioritize and identify impacted work items with highest probability of being broken, which helps teams focus on most likely regressions to occur and will increase time and space for innovation.

In one aspect, a processor-implemented method for artifact order and rank synchronization is disclosed. The method includes determining, using a ranking module, if a rank of an artifact has changed across disparate tools in an organization eco-system of a source comprising an end system from where integration reads the data for synchronization, by determining if hierarchy processing is required or not. The method also includes updating, using a rank update module, the rank of the artifact in a target comprising an end system where integration writes data.

In an embodiment, the determining if hierarchy processing is required includes storing ordering information captured from the source, comparing previously stored and current value using the ordering information to determine if rank processing is required, and marking a flag 'isOrderChanged' with one of: true or false, depending upon the determined change, for an event coining from the source.

In an embodiment, storing ordering information captured from source includes storing numeric or alphanumeric values to determine the order of the artifact, and relation-based approach, wherein tracking continuously the previous and next artifact to determine the overall ordering between the artifacts.

In an embodiment, the rank-based approach is applicable for systems where systems follow flat ordering with one of: single or multiple, artifact types.

In an embodiment, the relation-based approach for flat structure is performed via a numeric/alphanumeric value assigned to the artifact, wherein in the case of hierarchy/tree structure, a current artifact for which ordering is processed stores reference of the parent artifact along with the sibling level ordering.

In an embodiment, the steps to perform flat structure ordering includes reading an item before and an item after for an artifact in process, identifying corresponding target items, and updating transaction to adjust ordering information in the target system.

In an embodiment, the hierarchical structure ordering includes reading item before and item after plus parent item in hierarchy, for an entity in process, identifying corresponding target items in target system, and updating transaction to adjust ordering information in target system.

In an embodiment, updating rank in target includes checking if isOrderChanged is true, reading SRC_ORDER_INFO, wherein SRC_ORDER_INFO is the source artifact's ordering information, reading TGT_ORDER_INFO, wherein the TGT_ORDER_INFO is the target artifact's ordering information, at present, reading TGT_ORDER_INFO_DB, wherein the TGT_ORDER_INFO_DB is the target artifact's position information from the database, preparing target adjacent sibling artifacts to process with the information available in SRC_ORDER_INFO and TGT_ORDER_INFO performing a recovery check, detecting occurrence of a conflict, setting the artifact order in the target, by moving the artifact to a correct or derived position, storing the position detail within the database, and setting the hierarchy process completion flag to true.

In an embodiment, the SRC_ORDER_INFO includes information in format comprising a predecessor artifact id and a successor artifact id, wherein the logical sibling information is the artifacts before and after the item processed which is already synchronized to target system and the information is obtained via API of the end system.

In an embodiment, reading TGT_ORDER_INFO_DB includes OpsHub integration manager (OIM) that stores a hierarchy scope information within permanent storage like database, file system etc.

In an embodiment, the OpsHub Integration Manager comprises at least one of the scope of the hierarchy and if the hierarchy for the given entity is processed or not, wherein the information is captured based on the siblings collected from the target system.

In an embodiment, preparing target adjacent sibling artifacts to process with the information available in SRC_ORDER_INFO and TGT_ORDER_INFO further includes checking if TGT_ORDER_INFO==TGT_ORDER_INFO_DB, checking if order information of the target system is matching with the previously stored database state, which indicates there is no conflict and both systems are consistent in terms of ordering of artifact, transacting in target to maintain the hierarchy if there is no conflict as per the incoming information associated with source system siblings that is SRC_ORDER_INFO, obtaining RESULT=Process ORDER_TRANSACTION (SRC_ORDER_INFO), and performing a conflict case, wherein the condition will occur in case users have changed the location for this item in the target system.

In an embodiment, performing recovery check includes reading LATEST_TGT_ORDER_INFO, wherein LATEST_TGT_ORDER_INFO is the current positioning of target item, comparing and exiting if RESULT (ORDER_TRANSACTION)=LATEST_TGT_ORDER_INFO, and processing ORDER_TRANSACTION (SRC_ORDER_INFO) if the above condition is failed, wherein update artifact order in target system as per predecessor and successor given in SRC_ORDER_INFO.

In an embodiment, detecting the conflict includes:
a) checking if in case of an update transaction, a state stored in the permanent store matches with a current artifact order state of target artifacts.
b) fetching siblings of the target artifact, before and after;
c) fetching greater permanent state when same artifact is processed during a previous instance;
d) checking if state captured in b) and c) are not matching, in the case of conflict; and
e) generating error for manual intervention, upon no match.

In an embodiment, the target system API is used to update artifact position and API may accept numeric rank or take artifact that comes before or after the given artifact.

In another aspect, a system for artifact order and rank synchronization is disclosed. The system includes a memory for storing one or more executable modules and a processor for executing one or more executable modules for artifact order or rank synchronization. The one or more executable modules includes a ranking module for determining if a rank of an artifact has changed across disparate tools in an organization eco-system of a source comprising an end system from where integration reads the data for synchronization, by determining if hierarchy processing is required or not, and a rank update module for updating the rank of the artifact in a target comprising an end system where integration writes data.

In an embodiment, the ranking module is further configured for storing ordering information captured from the source, comparing previously stored and current value using the ordering information to determine if rank processing is required, and marking a flag 'isOrderChanged' with one of: true or false, depending upon the determined change, for an event coming from the source.

In an embodiment, the ranking module is further configured for storing numeric or alphanumeric values to determine the order of the artifact, tracking continuously the previous and next artifact to determine the overall ordering between the artifacts.

In an embodiment, performing the flat structure ordering includes reading an item before and an item after for an artifact in process, identifying corresponding target items, and updating transaction to adjust ordering information in the target system.

In an embodiment, hierarchical structure ordering includes reading item before and item after plus parent item in hierarchy, for an entity in process, identifying corresponding target items in target system, and updating transaction to adjust ordering information in target system.

The method and system of the present technology enables flat ordering artifact type. This is a most simplified structure, which has a flat structure within the same type of records. By using the present system, users can order artifacts in priority order in a flat structure. The system of the present technology enables hierarchical ordering artifact type. The structure contains parent child nodes, and level wise ordering within single artifact type. The system of the present technology can be used for any type of ALM, database, design, files, QA etc. that has concept of data ordering. The Artifact order, rank, hierarchy are often used synonymously. The system of the present technology can be extended to read or write to source and target system directly using database, files, library, APIs, web services, disk or any other way possible. In the system of present technology different types of models are used to represent hierarchy.

In one or more embodiments, related systems comprise circuitry and/or programming for executing the methods disclosed herein. The circuitry and/or programming are of any combination of hardware, software, and/or firmware configured to execute the methods disclosed herein depending upon the design choices of a system designer. In an embodiment, various structural elements are employed depending on the design choices of the system designer.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components and methods disclosed herein. The description of a component or a method step referenced by a numeral in a drawing is applicable to the description of that component or method step shown by that same numeral in any subsequent drawing herein.

The embodiments herein will be better understood from the following detailed description with reference to the drawings. The other objects, features and advantages will occur to those skilled in the art from the following description of the preferred embodiment and the accompanying drawings in which:

FIG. 4 illustrates a screen shot displaying an exemplary logical sibling information obtained via the end system's API, in accordance with an exemplary scenario;

FIG. 5 illustrates an exemplary Azure DevOps system, in accordance with an exemplary scenario;

Figure 1:
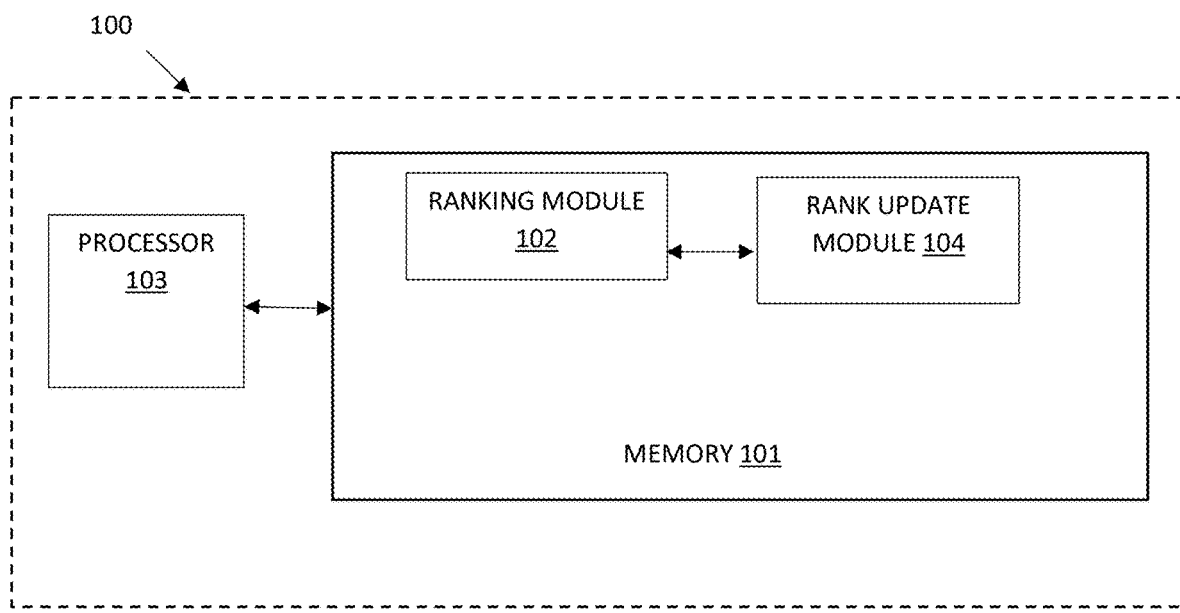
FIG. 1 illustrates a block diagram of the system for artifact order and rank synchronization, in accordance with an embodiment.

Although the specific features of the embodiments herein are shown in some drawings and not in others. This is done for convenience only as each feature may be combined with any or all of the other features in accordance with the embodiments herein.

DETAILED DESCRIPTION OF PREFERRED EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The various embodiments disclosed herein provide methods and systems for artifact order and rank synchronization. The various embodiment of the present invention provides a system and method for artifact order and rank synchronization. The method and system of the present technology enables flat ordering artifact type. This is a most simplified structure which has a flat structure within the same type of records. By using the present system, users can order artifacts in priority order in a flat structure. The system of the present technology enables hierarchical ordering artifact type. The structure contains parent child nodes, and level wise ordering within single artifact type. The system of the present technology can be used for any type of ALM, database, d sign, files, QA etc. that has concept of data ordering. The Artifact order, rank, hierarchy are often used synonymously. The system of the present technology can be extended to read or write to source and target system directly using database, files, library, APIs, web services, disk or any other way possible. In the system of present technology different types of models are used to represent hierarchy.

According to one embodiment, different types of models are used to represent hierarchy. The term "Ordering" as used herein refers to an order in which the set of artifacts needs to be worked upon. The ordering can include either by the stack rank by checking how artifacts are arranged one after each other in the view or any sort of custom ordering supported by different end systems. Ordering could be either in flat structure or within a hierarchical structure. At high level ordering, following are steps involved to perform flat structure ordering:

Read item before and item after for an artifact in-process
Identify corresponding target items (before and after)
Update transaction to adjust ordering information in target system.

At high level ordering, following are steps involved to perform hierarchical structure ordering:

Read item before, and item after parent item in hierarchy, for an entity in process
Identify corresponding target items (before and after, along with parent) in target system.
Update transaction to adjust ordering information in target system.

The different ways by which end system supports these functions are provided below. Flat ordering with single artifact type is a most simplified structure which has a flat structure within the same type of records. Users can order artifacts in priority order in a flat structure. For e.g.

a. Bug1
b. Bug4
c. Bug2
d. Bug3

This is a very basic and most common ordering structure where users usually order by priority, stack rank or criticality of the item.

Flat ordering with multiple artifact types is the model that, is similar to flat ordering with single artefact type in terms of structure but rank depends on multiple/cross artifact types. For e.g.

a. Bug1
b. User Story1
c. Task1
d. Bug2
e. User Story2

Hierarchical ordering with single artifact type is the structure that contains parent child nodes, and level wise ordering within single artifact type. This model of representing order or rank is complicated than flat ordering mechanism.

a. Story 1
　i. Story 2
b. Story 3
c. Story 4

Hierarchical ordering with multiple artifact type is similar to hierarchical ordering with single artefact in terms of structures but order or rank is maintained across different artifact types within same level.

a. Story 1
　i. Bug 1
　ii. Impediment 1
b. Bug 2
　i. Story 2

On high level, following are steps to perform hierarchical structure ordering

Read item before and item after parent item, along with the parent in hierarchy, for an entity in process
Identify corresponding target items (before and after, along with parent) in target system.
Update transaction to adjust ordering information in target system.

According to an embodiment, the process of storing ordering information in end system is provided. Typically, there are two ways in how systems store ordering information. In an embodiment, the rank-based approach and the other is relation-based approach. In the rank-based approach, the system stores numeric or alphanumeric values to determine the order of the artifact. This approach is mostly applicable for systems where systems follow flat ordering with either single or multiple artifact types. In another embodiment, a relation-based approach is employed, where the system keeps track of previous and next artifact to determine the overall ordering between the artifacts. For flat structure this is mostly done via a numeric/alphanumeric value assigned to the artifact, but in the case of hierarchy/tree structure, current artifact (for which ordering is being processed) stores its parent artifact's reference along with the sibling level ordering.

According to an embodiment, overall processing of hierarchy is provided. The overall processing of hierarchy is divided into two sections. One is to determine if rank is changed or not in source and the other is to update the rank in target. The process to determine if rank is changed or not in source starts with determining if hierarchy processing is needed or not. For any of the synchronizing events, if the order is unchanged then there is no need to do any extra processing. So, the first step is to determine if processing is required or not. The source is the end system from where integration reads the data for synchronization. Source/read side detects if rank or ordering information is changed in end system. Here, some end system simply tracks changes in the ordering information or rank within the history and creates a separate revision for such changes. Whereas some other type of systems does this operation silently. While end system does not track history for ordering information, previously stored ordering information is required to determine if rank information is changed or not. To achieve this, the ordering information is stored that is captured from source and make use of it to compare whenever again the present system gets any event from the source system. This procedure will compare old (previously stored) and current value to determine if rank processing is required or not. Depending upon the determined change, for each of the event coming from the source end point, a flag 'isOrderChanged' is marked with true/false. Mainly to indicate that hierarchy changes is required to be processed or not on a later stage while making changes over the target end point. The other process is to update the rank in target. There are two parts in this process which are target and adapter. In target, integration writes data in the end system. In the adapter, in a normal flow of execution, responsibility of adapter is to identify which operations are required to be carried out on the target end point. i.e., update artifact, add attachments, comments etc. These operations are arranged in a sequence which highly depends upon how target system's API operates. i.e., attachment cannot be added while creating an item or updating an item. Order/rank processing on target side also becomes a part of this sequence of operations. Therefore, after all the other operations such as basic create/update, attachments, comments or any other steps completed, then order processing starts in the last step.

FIG. 1 illustrates block diagram of the system 100 for artifact order or rank synchronization, in accordance with an embodiment. The system 100 includes a memory 101 for storing one or more executable modules and a processor 103 for executing one or more executable modules for artifact order or rank synchronization. The "processor 103" includes any hardware and/or software system, mechanism or component that processes data, signals or other information. A processor can include a system with a general-purpose central processing unit, multiple processing units, dedicated circuitry for achieving functionality, or other systems. For example, a processor can perform its functions in "real time," "offline," in a "batch mode," etc. Portions of processing can be performed at different times and at different locations, by different (or the same) processing systems. The one or more executable modules includes a ranking module 102 for determining if a rank of an artifact has changed across disparate tools in an organization eco-system of a source comprising an end system from where integration reads the data for synchronization, by determining if hierarchy processing is required or not, and a rank update module 104 for updating the rank of the artifact in a target comprising an end system where integration writes data.

In an embodiment, the ranking module 102 is further configured for storing ordering information captured from the source, comparing previously stored and current value using the ordering information to determine if rank processing is required, and marking a flag 'isOrderChanged' with one of: true or false, depending upon the determined change, for an event coming from the source.

In an embodiment, the ranking module 102 is further configured for storing numeric or alphanumeric values to determine the order of the artifact, tracking continuously the previous and next artifact to determine the overall ordering between the artifacts.

In an embodiment, performing the flat structure ordering includes reading an item before and an item after for an artifact in process, identifying corresponding target items, and updating transaction to adjust ordering information in the target system.

In an embodiment, hierarchical structure ordering includes reading item before and item after plus parent item in hierarchy, for an entity in process, identifying corresponding target items in target system, and updating transaction to adjust ordering information in target system.

Figure 2:
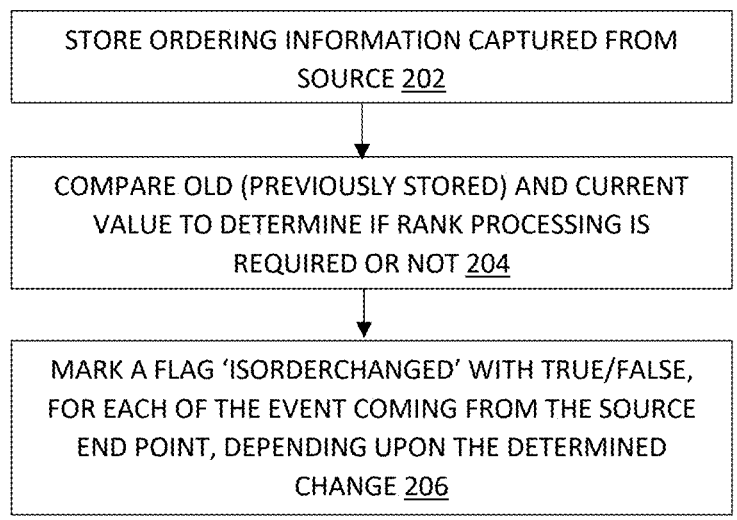
FIG. 2 illustrates a flowchart explaining a method to determine if rank information is changed or not, in accordance with an embodiment.
Figure 3A:
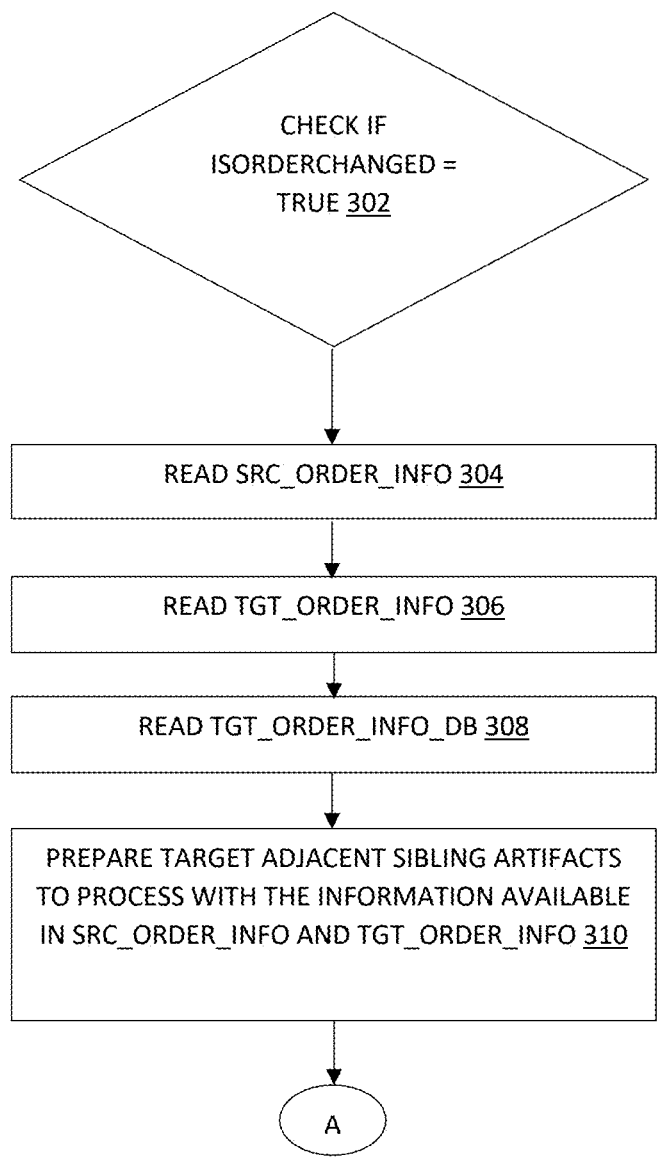
FIG. 3A-3D illustrates flowchart explaining a method to identify which operations are required to be carried out on the target end point, in accordance with an embodiment.
Figure 3B:
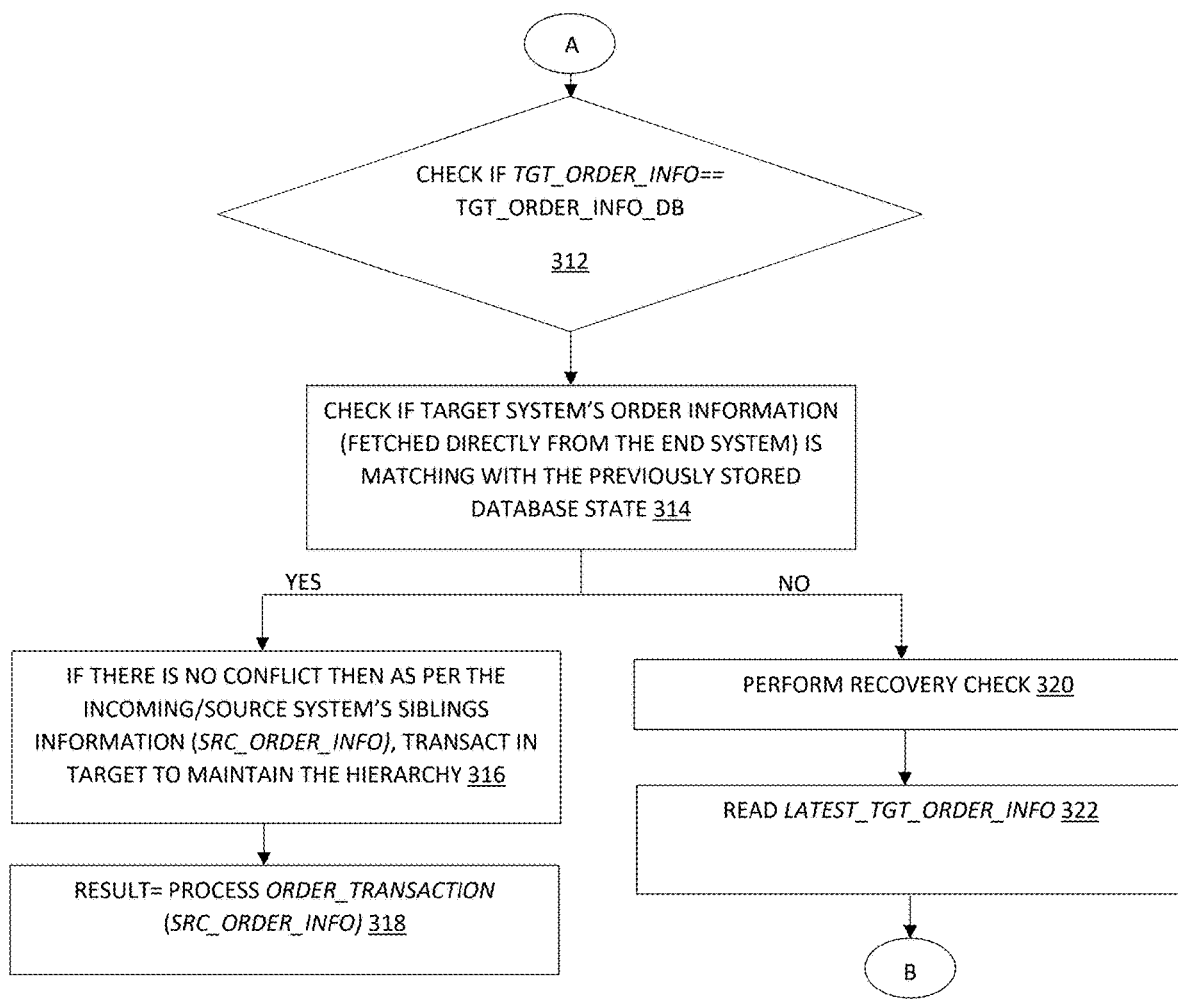
Figure 3C:
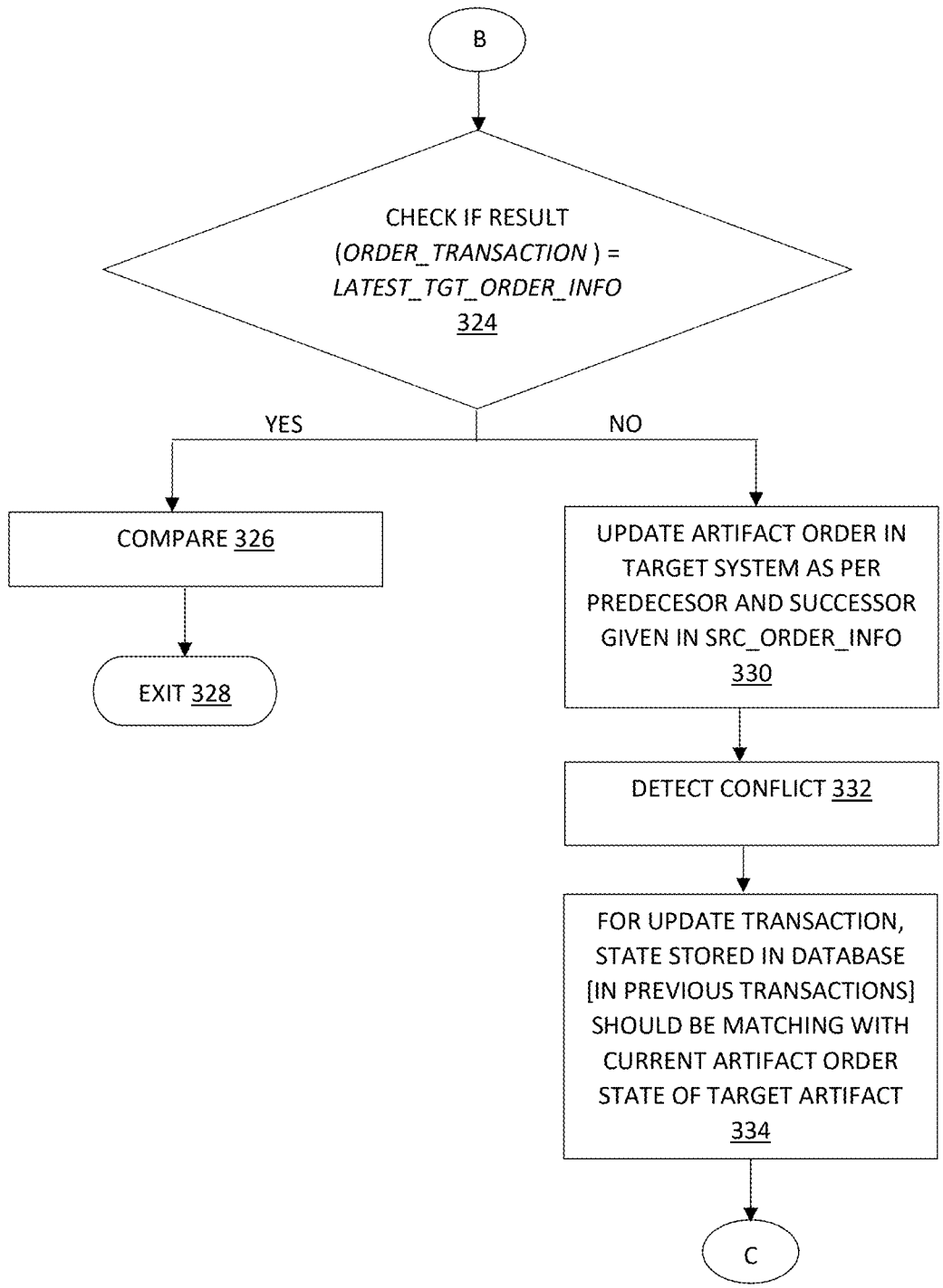
Figure 3D:
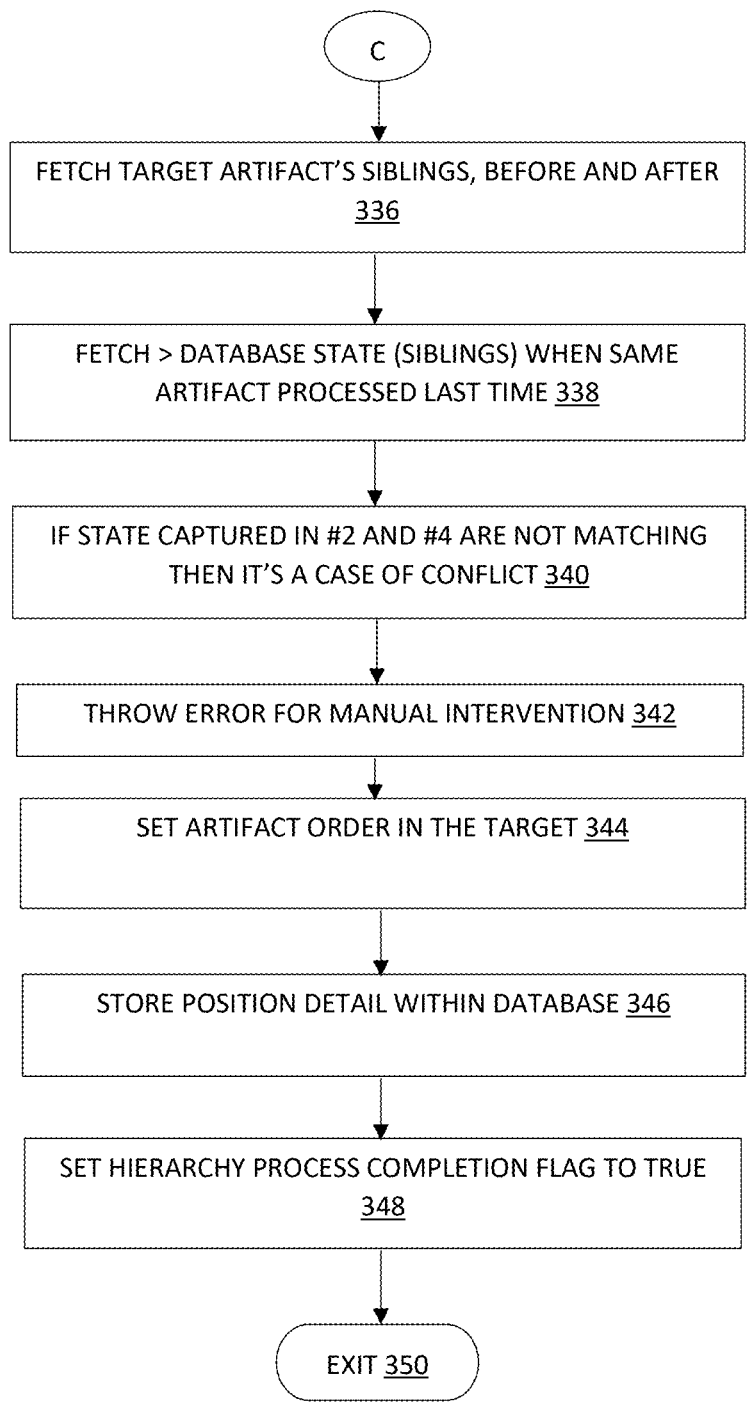

FIG. 2 illustrates flowchart to determine if rank information is changed or not, in accordance with an embodiment. At step 202, the ordering information captured from source is stored. At step 204, old (previously stored) and current value are compared to determine if rank processing is required or not. At, step 206, a flag 'isorderchanged' is marked with true/false, for each of the event coming from the source end point, depending upon the determined change.

FIG. 3A-3D illustrates flowchart to identify which operations are required to be carried out on the target end point, in accordance with an embodiment. This is high level algorithm which explains complex logic in simple terms. This only triggers when 'isOrderChanged' is set to true by source side processing logic. At step 302, it is checked if "isorderchanged" is equal to true. At step 304, read SRC_ORDER_INFO is performed. The SRC_ORDER_INFO is ordering information of source artifact. It contains information in format like (predecessor artifact id, successor artifact id). The logical sibling information is the information of the artifact(s) before and after the item are processed that is already synchronized to target system. This information is obtained via the end system's API. In case the first artifact to synchronize is processed then this information is irrelevant because anyhow this will be the first reference point and only item on the target, Example: If A, B, C, D are present in target with same order, (B, D) will be fetched from the source if the system is querying order information for item C. Here B is the predecessor and D is the successor. At step 306, read TGT_ORDER_INFO is performed. TGT_ORDER_INFO is the target artifact's ordering information, at present. It contains information in a format like (predecessor artifact id, successor artifact id). At step 308, read TGT_ORDER_INFO_DB is performed. TGT_ORDER_INFO_DB is the target artifact's position information from the database. Database refers to the synchronization platform permanent storage like any kind of SQL, NoSQL database or file system. This is any database used by synchronization solution that stores all the configuration information, synchronization details between various end systems. Basically, it holds every part of data needed and produced by the synchronization tool. If this is an update transaction then, OpsHub Integration Manager (OIM) stores hierarchy scope information within a table, which contains two things, the scope of the hierarchy and if the hierarchy for the given entity is processed or not. This information is captured based on the siblings collected from the target system. Example: If the system is querying the location of B, the system will figure out what was its previous location based on our database state. All the siblings of the target artifact/relevant position or level. This step is for calculating order information as per the artifact's position in the target system. This step is about getting logical sibling information from target system, e.g., for C, siblings in target are B and E. Finally, outcome from this step will be used to determine the target transaction and conflict situation in the next steps.

Example: illustrations are given in the logic based on this example.

Items are in following order in source system
A
B
C
D
SRC_ORDER_INFO for item B is (A,C).
Now if out of the above items, only A, B, D are transferred to the target.
TGT_ORDER_INFO for item B would be (A,D). C is still not present in target system.
Also, OpsHub Integration Manager (OIM) database level state for the target system will represent the same state as TGT_ORDER_INFO.

At step 310, target adjacent sibling artifacts is prepared to process with the information available in SRC_ORDER_INFO and TGT_ORDER_INFO. With the information available in SRC_ORDER_INFO and TGT_ORDER_INFO, target adjacent sibling artifacts is prepared to process with. At step 312, it is checked if TGT_ORDER_INFO is exactly equal to TGT_ORDER_INFO_DB. At step 314, in case target system's order information (fetched directly from the end system) is matching with the previously stored database state then there is no conflict and both systems are consistent in terms of ordering of artifact. Typically, systems provide APIs that can be used to fetch order information. If APIs are not available, then data can be fetched from database, files in however form, target system is storing data. At step 316, if there is no conflict then as per the incoming/source system's siblings information (SRC_ORDER_INFO), transaction in target is performed to maintain the hierarchy. At step 318, RESULT=Process ORDER_TRANSACTION (SRC_ORDER_INFO) is determined. This means if in the next steps, artifact order is required to be updated in target then artifact should be ordered as per predecessor and successor defined in SRC_ORDER_INFO. At step 312, if it is not equal then the condition will occur in case users have changed the location for this item in the target system. This situation is called conflict that is the case where database state and end system state does not match. Now, if there is no conflict then as per the incoming/source system's siblings information, transaction is needed to be processed in target to maintain the hierarchy. At step 320, recovery check is performed. At step 322, read LATEST_TGT_ORDER_INFO is performed. The LATEST_TGT_ORDER_INFO is the current positioning of target item. This is actual position of artifact in target, as of now. At step 324, it is checked if result (ORDER_TRANSACTION) is equal to LATEST_TGT_ORDER_INFO. At step 326, compare & exit 328 is performed if result (ORDER_TRANSACTION) is equal to LATEST_TGT_ORDER_INFO. At step 330, if in case the above condition that is (ORDER_TRANSACTION) is not equal to LATEST_TGT_ORDER_INFO is failed, ORDER_TRANSACTION (SRC_ORDER_INFO) that is the update artifact order in target system is processed as per predecesor and successor given in SRC_ORDER_INFO. At step 332, the conflict is detected. At step 334, in case of update transaction, state stored in database [in previous transactions] should be matching with current artifact order state of target artifact. At step 336, target artifact's siblings are fetched before and after. At step 338, fetch is greater than database state (siblings) when same artifact processed last time. At step 340, if state captured in #2 and #4 are not matching then it's a case of conflict. This means some other users might have updated ordering on target side, which makes the ordering inconsistent. At step 342, error is thrown for manual intervention. At step 344, the artifact order is set in the target. At step 346, the position detail is stored within database. At step 348, the hierarchy process is set, for completion flag to true. At step 350, exit is performed.

FIG. 4 illustrates an exemplary logical sibling information obtained via the end system's API, in accordance with an exemplary scenario. The logical sibling information is before item and after item for any given entity, but in context of already transferred/synchronized data in target system. That is,

A
B
C
D

For example, if in the source system have the above items in the given order. Out of all these items, only B and E are transferred in target system. The logical sibling for item C is (B, E). As those are present in target at this point and order is required to be adjusted between these two items. All end systems (Jira, Azure DevOps etc.) provides ordering information via their APIs. For example, Jira R4j provides ordering information in following structure via their APIs. Here parent key contains detail of parent item as well as issues contains all the child items which that parent. Using position, one can determine its logical sibling information.

FIG. 5 illustrates an exemplary Azure DevOps system, in accordance with an exemplary scenario. In this example, Azure DevOps system is preserving ordering information within a numeric field called stack rank. Along with its parent information it provides all the details via its rest APIs.

Figure 6:
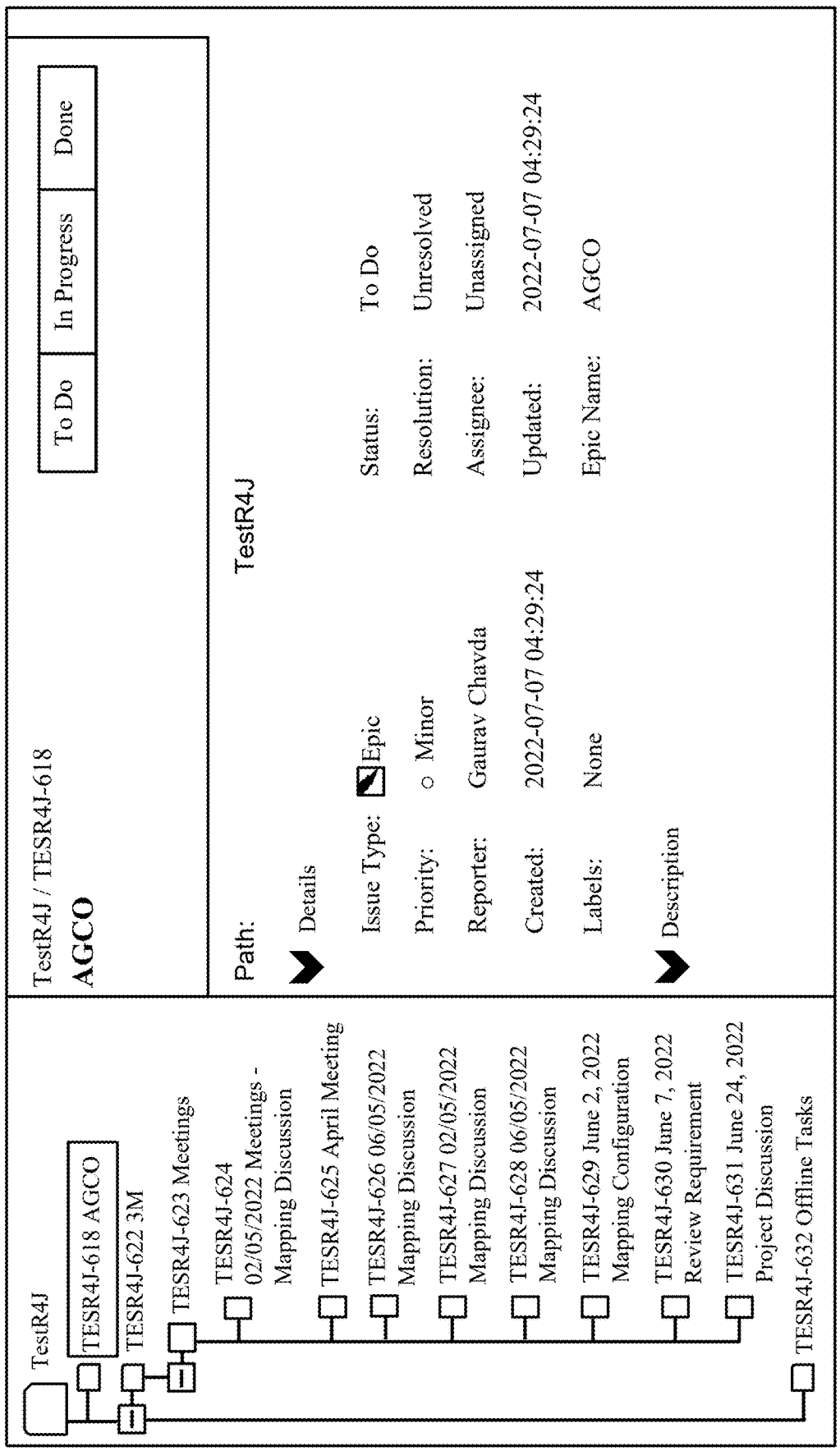
FIG. 6 illustrates an exemplary Jira R4J plugin, in accordance with an exemplary scenario.

FIG. 6 illustrates an exemplary Jira R4J plugin system, in accordance with an exemplary scenario. Similarly in this example, Jira R4J plugin allows arranging issues in hierarchy structure and ordering within the same level. Post synchronization of Azure DevOps data will look like above in Atlassian Jira R4J plugin.

Figure 7:
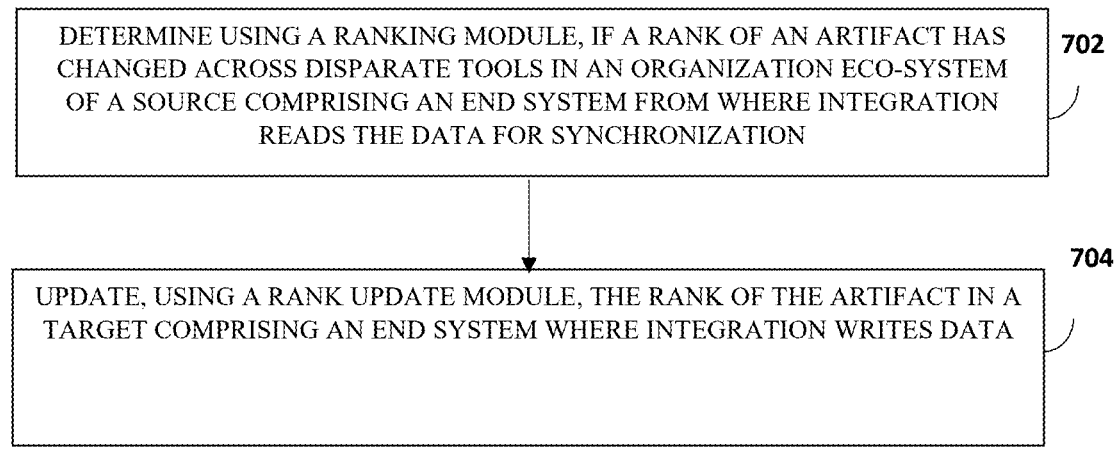
FIG. 7 illustrates a flow diagram of method for artifact order and rank synchronization, in accordance with an embodiment.

FIG. 7 illustrates a flow diagram of method for artifact order or rank synchronization, in accordance with an embodiment. At step 702, the method includes determining using a ranking module, if a rank of an artifact has changed across disparate tools in an organization eco-system of a source comprising an end system from where integration reads the data for synchronization, by determining if hierarchy processing is required or not. At step 704, the method includes updating, using a rank update module, the rank of the artifact in a target comprising an end system where integration writes data.

In an embodiment, the determining if hierarchy processing is required includes storing ordering information captured from the source, comparing previously stored and current value using the ordering information to determine if rank processing is required, and marking a flag 'isOrderChanged' with one of: true or false, depending upon the determined change, for an event coming from the source.

In an embodiment, storing ordering information captured from source includes storing numeric or alphanumeric values to determine the order of the artifact, and relation-based approach, wherein tracking continuously the previous and next artifact to determine the overall ordering between the artifacts.

In an embodiment, the rank-based approach is applicable for systems where systems follow flat ordering with one of single or multiple, artifact types.

In an embodiment, the relation-based approach for flat structure is performed via a numeric/alphanumeric value assigned to the artifact, wherein in the case of hierarchy/tree structure, a current artifact for which ordering is processed stores reference of the parent artifact along with the sibling level ordering.

In an embodiment, the steps to perform flat structure ordering includes reading an item before and an item after for an artifact in process, identifying corresponding target items, and updating transaction to adjust ordering information in the target system.

In an embodiment, the hierarchical structure ordering includes reading item before and item after plus parent item in hierarchy, for an entity in process, identifying corresponding target items in target system, and updating transaction to adjust ordering information in target system.

In an embodiment, updating rank in target includes checking if isOrderChanged is true, reading SRC_ORDER_INFO, wherein SRC_ORDER_INFO is the source artifact's ordering information, reading TGT_ORDER_INFO, wherein the TGT_ORDER_INFO is the target artifact's ordering information, at present, reading TGT_ORDER_INFO_DB, wherein the TGT_ORDER_INFO_DB is the target artifact's position information from the database, preparing target adjacent sibling artifacts to process with the information available in SRC_ORDER_INFO and TGT_ORDER_INFO, performing a recovery check, detecting occurrence of a conflict, setting the artifact order in the target, by moving the artifact to a correct or derived position, storing the position detail within the database, and setting the hierarchy process completion flag to true.

In an embodiment, the SRC_ORDER_INFO includes information in format comprising a predecessor artifact id and a successor artifact id, wherein the logical sibling information is the artifacts before and after the item processed which is already synchronized to target system and the information is obtained via API of the end system.

In an embodiment, reading TGT_ORDER_INFO_DB includes OpsHub integration manager (OIM) that stores a hierarchy scope information within a table.

In an embodiment, the OpsHub Integration Manager comprises at least one of: the scope of the hierarchy and if the hierarchy for the given entity is processed or not, wherein the information is captured based on the siblings collected from the target system.

In an embodiment, preparing target adjacent sibling artifacts to process with the information available in SRC_ORDER_INFO and TGT_ORDER_INFO further includes checking if TGT_ORDER_INFO==TGT_ORDER_INFO_DB, checking if order information of the target system is matching with the previously stored database state, which indicates there is no conflict and both systems are consistent in terms of ordering of artifact, transacting in target to maintain the hierarchy if there is no conflict as per the incoming information associated with source system siblings that is SRC_ORDER_INFO, obtaining RESULT=Process ORDER_TRANSACTION (SRC_ORDER_INFO), and performing a conflict case, wherein the condition will occur in case users have changed the location for this item in the target system.

In an embodiment, performing recovery check includes reading LATEST_TGT_ORDER_INFO, wherein LATEST_TGT_ORDER_INFO is the current positioning of target item, comparing and exiting if RESULT (ORDER_TRANSACTION)=LATEST_TGT_ORDER_INFO, and processing ORDER_TRANSACTION (SRC_ORDER_INFO) if the above condition is failed, wherein update artifact, order in target system as per predecessor and successor given in SRC_ORDER_INFO.

In an embodiment, detecting the conflict includes:
a) checking if in case of an update transaction, a state stored in the database matches with a current artifact order state of target artifacts;
b) fetching siblings of the target artifact, before and after;
c) fetching greater database state when same artifact is processed during a previous instance;
d) checking if state captured in b) and c) are not matching, in the case of conflict: and
e) generating error for manual intervention, upon no match.

In an embodiment, the target system API is used to update artifact position and API may accept numeric rank or take artifact that comes before or after the given artifact.

Various embodiments disclosed herein provide methods and systems for artifact order or rank synchronization. The various embodiment of the present invention provides a system and method for artifact order or rank synchronization. The method and system of the present technology enables flat ordering artifact type. This is a most simplified structure which has a flat structure within the same type of records. Users can order artifacts in priority order in a flat structure. The system of the present technology enables hierarchical ordering artifact type. The structure contains parent child nodes, and level wise ordering within single artifact type. The system of the present technology can be used for any type of ALM, database, design, files, QA etc. that has concept of data ordering. The Artifact order, rank, hierarchy are often used synonymously. The system of the present technology can be extended to read or write to source and target system directly using database, files, library, APIs, web services, disk or any other way possible. In the system of present technology different types of models are used to represent hierarchy.

As will be readily apparent to those skilled in the art, the present invention may easily be produced in other specific forms without departing from its essential characteristics. The present embodiments are, therefore, to be considered as merely illustrative and not restrictive, the scope of the invention being indicated by the claims rather than the foregoing description, and all changes which come within therefore intended to be embraced therein.

A "non-transitory computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real time," "offline," in a "batch mode," etc. Portions of processing can be performed at different times and at different locations, by different (or the same) processing systems.

The embodiments herein can take the form of, an entirely hardware embodiment, an entirely software embodiment or an embodiment including both hardware and software elements. The embodiments that are implemented in software include but are not limited to, firmware, resident software, microcode, and the like. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, hulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims.

What is claimed is:

1. A processor-implemented method for artifact order and rank synchronization, the method comprising:
   determining if a hierarchy of an artifact has been changed across a source endpoint and a target endpoint, and performing hierarchy processing at said target endpoint in an event said artifact has been changed at said target endpoint and updating the hierarchy of the artifact at the target endpoint, and wherein performing said hierarchy processing at said target endpoint comprises:
      reading a variable termed SRC-ORDER-INFO, wherein the variable SRC-ORDER-INFO stores the artifact's ordering information at the source endpoint, usable for identifying a predecessor and a successor for the artifact at the source endpoint;
      reading a variable termed TGT-ORDER-INFO, wherein the variable TGT-ORDER-INFO stores the artifact's current ordering information at said target endpoint, usable for identifying a predecessor and a successor for the artifact at the target endpoint;
      reading a variable termed TGT-ORDER-INFO-DB, wherein the variable TGT-ORDER-INFO-DB denotes the artifact's position information at the target endpoint, derived based on a previous database state;
      generating, at the target endpoint, logical sibling information corresponding to at least one processed artifact on which said hierarchy processing was previously performed, by synchronizing the processed artifact's ordering information at the source endpoint with the processed artifact's ordering information at the target endpoint;
      identifying sibling artifacts positioned adjacent to the artifact at the target endpoint and processing identified sibling artifacts based on the ordering information stored in variables SRC-ORDER-INFO and TGT-ORDER-INFO, respectively;
      comparing the artifact's current ordering information at said target endpoint with the artifact's position information derived based on the previous database state;
      in an event the artifact's current ordering information at said target endpoint is equivalent to the artifact's position information derived based on the previous database state, performing an ordering transaction at the target endpoint to maintain the hierarchy of the artifact as per the artifact's ordering information at the source endpoint, stored in the variable SRC-ORDER-INFO;
      in an event the artifact's current ordering information at said target endpoint is not equivalent to the artifact's position information derived based on the previous database state, updating the hierarchy of the artifact at the target endpoint as per the successor and the predecessor identified by the artifact's ordering information stored in the variable SRC-ORDER-INFO.

2. The method of claim 1, wherein the method further comprises:
   capturing the ordering information corresponding to a plurality of events associated with the artifact at the source endpoint, and storing the ordering information in a predetermined database;
   comparing previously stored values corresponding to each of the events with current values corresponding to each of the events, and determining if the current values have changed from the previously stored values, and determining if the hierarchy processing is to be performed at the target endpoint; and
   marking a flag termed 'isOrderChanged' as true for every event corresponding to the artifact at the source endpoint, if the current values corresponding to said event are determined to have been changed from the previously stored values, and wherein the flag 'isOrderChanged' is set to true to indicate that hierarchy changes corresponding to the artifact are to be processed at the target endpoint.

3. The method of claim 2, wherein storing the ordering information:
   storing numeric or alphanumeric values to determine an order of the artifact at the source endpoint; and
   implementing a relation-based approach involving continuous tracking of a previous artifact and a next artifact corresponding to the artifact at the source endpoint, to determine an overall ordering between a plurality of artifacts.

4. The method of claim 3, wherein the relation-based approach is implemented for a flat file structure by assigning a numeric/alphanumeric value to every artifact, wherein in case of a hierarchy/tree structure, a current artifact for which ordering is processed stores a reference to a parent artifact along with sibling level ordering.

5. The method of claim 1, wherein the variable SRC-ORDER-INFO comprises the logical sibling information, said logical sibling information including a predecessor artifact ID and a successor artifact ID indicative of a predecessor artifact and a successor artifact to the artifact at the source endpoint, and wherein the logical sibling information identifies artifacts positioned before and after the processed artifact at the source endpoint and the target endpoint, and wherein the logical sibling information is synchronized to the target endpoint and the logical sibling information is extracted via a predetermined Application Program Interface (API) of the target endpoint.

6. The method of claim 1, wherein hierarchy scope information corresponding to the artifact is stored on a permanent storage, and wherein the permanent storage is a database or a file system, and wherein the database is at least one of a synchronization platform-based permanent storage, an SQL database, and a NoSQL database.

7. The method of claim 5, wherein the hierarchy scope information corresponding to the artifact at the target endpoint denotes if the hierarchy for the artifact at the source endpoint is processed, wherein the hierarchy scope information is captured based on the logical sibling information collected from the target endpoint, and wherein the hierarchy scope information includes the artifact's current ordering information at the target endpoint and the previous database state corresponding to the artifact, and wherein said previous database state indicates the artifact's ordering information at the target endpoint when the artifact was previously processed at the target endpoint.

8. The method of claim 1, wherein the method further includes determining there is no conflict between the source endpoint and the target endpoint and further determining that both the source endpoint and the target endpoint are consistent in terms of ordering of the artifact, in an event the artifact's current ordering information at said target endpoint is equivalent to the artifact's position information derived based on the previous database state.

9. The method of claim 1, wherein the method further includes performing a recovery check while performing said hierarchy processing, and wherein performing the recovery check further comprises:
    reading a variable termed LATEST-TGT-ORDER-INFO, wherein the variable LATEST-TGT-ORDER-INFO stores a current hierarchy of the artifact at the target endpoint;
    determining if the current hierarchy of the artifact at the target endpoint is equivalent to the hierarchy of the artifact, maintained at the target artifact based on an implementation of said ordering transaction; and
    in an event the current hierarchy of the artifact at the target endpoint is determined not to be equivalent to the hierarchy of the artifact, maintained at the target artifact based on the implementation of said ordering transaction, updating the hierarchy of the artifact at the target endpoint as per the successor and the predecessor identified by the artifact's ordering information stored in the variable SRC-ORDER-INFO.

10. The method of claim 1, wherein the method comprises checking, in case of an update transaction, if a state stored in a predetermined database matches with a current artifact order state of corresponding to a target artifact, and wherein the method further comprises:
    fetching sibling artifacts corresponding to the target artifact, said sibling artifacts including an artifact positioned before the target artifact and an artifact positioned after the target artifact;
    fetching a database state corresponding to the target artifact, said database state indicative of a state when said target artifact was processed during a previous instance;
    checking if the sibling artifacts corresponding to the target artifact match with fetched database state; and
    generating an error in an event the sibling artifacts corresponding to the target artifact do not match with the fetched database state, and detecting an occurrence of the conflict between the current order artifact state at the target endpoint and the fetched database state.

11. A system for artifact order and rank synchronization, the system comprising:
    a memory for storing computer-executable instructions; and
    a processor configured to execute said computer-executable instructions for implementing artifact order and rank synchronization, the processor further configured to:
        determine if a hierarchy of an artifact has been changed across a source endpoint and a target endpoint, and perform hierarchy processing at said target endpoint in an event said artifact has been changed at said target endpoint and update the hierarchy of the artifact at the target endpoint and
    wherein said processor is further configured to:
        read a variable termed SRC-ORDER-INFO, wherein the variable SRC-ORDER-INFO stores the artifact's ordering information at the source endpoint, usable for identifying a predecessor and a successor for the artifact at the source endpoint;
        read a variable termed TGT-ORDER-INFO, wherein the variable TGT-ORDER-INFO stores the artifact's current ordering information at said target endpoint, usable for identifying a predecessor and a successor for the artifact at the target endpoint;
        read a variable termed TGT-ORDER-INFO-DB, wherein the variable TGT-ORDER-INFO-DB denotes the artifact's position information at the target endpoint, derived based on a previous database state;
        generate, at the target endpoint, logical sibling information corresponding to at least one processed artifact on which said hierarchy processing was previously performed, by synchronizing the processed artifact's ordering information at the source endpoint with the processed artifact's ordering information at the target endpoint;
        identify sibling artifacts positioned adjacent to the artifact at the target endpoint and processing identified sibling artifacts based on the ordering information stored in variables SRC-ORDER-INFO and TGT-ORDER-INFO, respectively;
        compare the artifact's current ordering information at said target endpoint with the artifact's position information derived based on the previous database state;
        in an event the artifact's current ordering information at said target endpoint is equivalent to the artifact's position information derived based on the previous database state, perform an ordering transaction at the target endpoint to maintain the hierarchy of the artifact as per the artifact's ordering information at the source endpoint, stored in the variable SRC-ORDER-INFO;
        in an event the artifact's current ordering information at said target endpoint is not equivalent to the artifact's position information derived based on the previous database state, updating the hierarchy of the artifact at the target endpoint as per the successor and the predecessor identified by the artifact's ordering information stored in the variable SRC-ORDER-INFO.

12. The system as claimed in claim 11, wherein the processor is further configured to:
    capture the ordering information corresponding to a plurality of events associated with the artifact at the source endpoint, and storing the ordering information in a predetermined database;

compare previously stored values corresponding to each of the events with current values corresponding to each of the events, and determine if the current values have changed from the previously stored values, and determine if the hierarchy processing is to be performed at the target endpoint; and mark a flag termed 'isOrderChanged' as true for every event corresponding to the artifact at the source endpoint, if the current values corresponding to said event are determined to have been changed from the previously stored values, and wherein the flag 'isOrderChanged' is set to true to indicate that hierarchy changes corresponding to the artifact are to be processed at the target endpoint.

* * * * *